| (12) | United States Patent | (10) Patent No.: | US 7,264,098 B2 |
|---|---|---|---|
| | McPherson | (45) Date of Patent: | Sep. 4, 2007 |

(54) HARMONIC DAMPER FOR HANDHELD INSTRUMENTS

(76) Inventor: Mathew A. McPherson, 19055 Incline Rd., Route 2, P.O. Box 58, Norwalk, WI (US) 54648

( * ) Notice: Subject to any disclaimer, the term of this patent is extended or adjusted under 35 U.S.C. 154(b) by 0 days.

(21) Appl. No.: 10/871,213

(22) Filed: Jun. 18, 2004

(65) Prior Publication Data

US 2005/0279599 A1    Dec. 22, 2005

(51) Int. Cl.
*F16F 7/00*    (2006.01)

(52) U.S. Cl. .................. 188/379; 267/136; 267/137

(58) Field of Classification Search ........... 188/378, 188/379, 380; 267/136, 137; 473/520, 521, 473/523; 81/22
See application file for complete search history.

(56) References Cited

U.S. PATENT DOCUMENTS

| 2,928,444 | A | * | 3/1960 | Ivins | 81/22 |
|---|---|---|---|---|---|
| 3,674,267 | A | * | 7/1972 | Hollis | 473/552 |
| 4,691,926 | A | * | 9/1987 | Adam | 473/552 |
| 4,927,143 | A | * | 5/1990 | Hillock | 473/522 |
| 4,948,131 | A | * | 8/1990 | Nakanishi | 473/521 |
| 5,180,147 | A | * | 1/1993 | Andersson et al. | 267/136 |
| 5,655,980 | A | | 8/1997 | Nashif et al. | 473/520 |
| 5,704,259 | A | * | 1/1998 | Riehle | 81/22 |
| 5,964,672 | A | | 10/1999 | Bianchi | 473/521 |
| 6,007,439 | A | | 12/1999 | MacKay, Jr. | 473/520 |
| 6,117,028 | A | | 9/2000 | You | 473/520 |
| 6,257,220 | B1 | | 7/2001 | McPherson et al. | 124/89 |
| 6,382,201 | B1 | | 5/2002 | McPherson et al. | 124/89 |
| 6,709,352 | B1 | | 3/2004 | Albin | 473/520 |

* cited by examiner

*Primary Examiner*—Bradley King
(74) *Attorney, Agent, or Firm*—Vidas, Arrett & Steinkraus, PA

(57) ABSTRACT

A damper for reducing vibrations in a handheld device, tool and/or instrument may comprise a resilient member and a weight. The resilient member may mounted to any portion of a device having a surface suitable for engaging and retaining the resilient member therein, and the resilient member may have an inside surface suitable for engaging and retaining the weight. In some embodiments, additional resilient members may be arranged to engage and retain the weight.

24 Claims, 10 Drawing Sheets

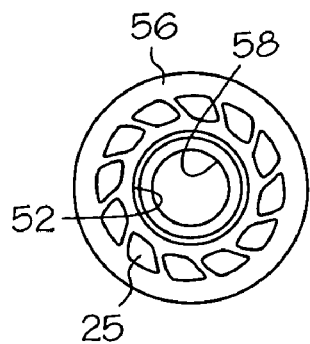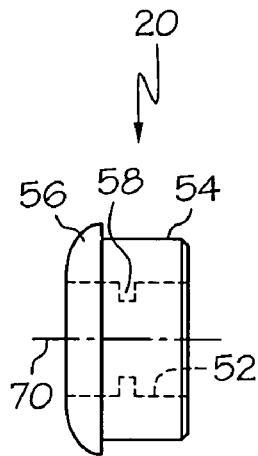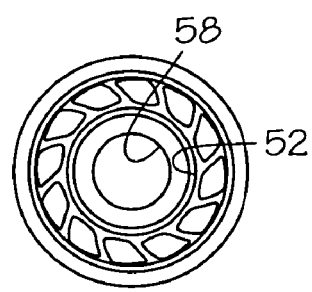
FIG. 11A FIG. 11B FIG. 11C
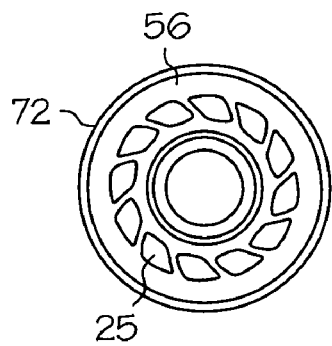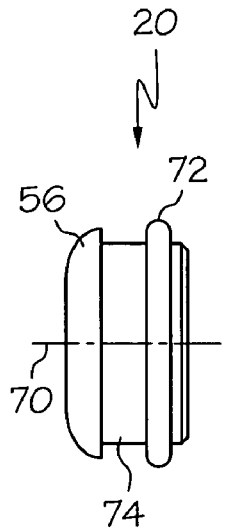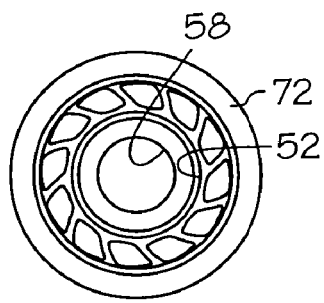
FIG. 12A FIG. 12B FIG. 12C

HARMONIC DAMPER FOR HANDHELD INSTRUMENTS

BACKGROUND OF THE INVENTION

This invention relates to a damper which may be used to reduce vibrations in elongate handheld devices, tools, striking devices, sporting equipment and the like. Some specific examples are baseball bats, cricket bats, golf clubs, hockey sticks, tennis rackets, squash rackets, racquetball rackets, badminton rackets, table tennis paddles, croquet mallets, polo sticks, lacrosse sticks, oars, pool cues, nightsticks, hammers, axes, picks, saws, files, rasps, punches, chisels and rachets.

The above listed devices and other similar devices are generally known and may be used for their respective intended purposes. During normal use, various vibrations may be generated which may travel throughout the item and may transfer to the user. For example, vibrations may be generated by striking another object. These vibrations may be uncomfortable and may even cause injury.

It would be desirable to damp the vibrations present in various handheld devices during and after normal use which generates vibration.

U.S. Pat. Nos. 6,257,220 and 6,382,201 to McPherson et al. discuss vibration dampers as applied to archery bows, and are incorporated herein by reference in their entireties.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In one embodiment, a vibration damper for a handheld device may comprise a resilient member and a weight. The resilient member may be mounted to a portion of a handheld device having a surface suitable for engaging and retaining the resilient member therein. The resilient member may have an inside surface suitable for engaging and retaining the weight.

In some embodiments, at least a portion of the resilient member may be made of rubber, and at least a portion of the weight may be made of tungsten.

The handheld device may include a handle, and the damper may be mounted to the handle. The damper may further be mounted within the handle, and may be hidden from view.

The resilient member may comprise a cylindrical shape having a central axis, and the central axis may be centered upon a longitudinal axis of a tubular portion of the handheld device. The resilient member may include a plurality of apertures, each aperture having a longitudinal axis. The longitudinal axis of each aperture may be parallel to the central axis of the resilient member.

In some embodiments, the weight may be entirely supported by the resilient member.

In some embodiments, an outer surface of the resilient portion may include a raised engagement flange for frictionally engaging the handheld device. Further, an inside surface of the resilient member may include a flange, and the weight may include a recess arranged to mate with the flange.

In another embodiment, a vibration damper for a handheld device may comprise a weight, a first resilient member having an inside surface suitable for engaging and retaining a portion of the weight and a second resilient member having an inside surface suitable for engaging and retaining a portion of the weight. The first resilient member may be mounted to a portion of a handheld device having a surface suitable for engaging and retaining the first resilient member therein, and the second resilient member may be mounted to a portion of the handheld device having a surface suitable for engaging and retaining the second resilient member therein.

The weight may be entirely supported by the first resilient member and the second resilient member.

The inside surface of the first resilient member may include a first internal flange. The inside surface of the second resilient member may include a second internal flange. The weight may include a first recess arranged to mate with the first internal flange and a second recess arranged to mate with the second internal flange.

The first resilient member may comprise an annular shape having a central axis. The second resilient member may comprise an annular shape having a central axis. The weight may comprise a cylindrical shape having a longitudinal axis. The central axes of the first and second resilient members may be centered upon the longitudinal axis of the weight.

The first resilient member and the second resilient member may each comprise an annular shape having a central axis and a plurality of apertures, each aperture having a longitudinal axis. The longitudinal axis of each aperture may be parallel to the central axis of the resilient member.

The first resilient member may include a mounting flange arranged to abut the portion of the handheld device engaging and retaining the first resilient member. The damper may be mounted within a portion of a handle, and the mounting flange of the first resilient member may abut an end of the handle.

In some embodiments, the first resilient member may further comprise an annular shape having an annular channel. The annular channel may have a U-shaped cross-section.

The first and second resilient members may bias the weight toward a nominal position. The weight may have a longitudinal axis, and the weight may displace with respect to the first damper in directions orthogonal to the longitudinal axis. The weight may also displace with respect to the first damper in directions parallel to the longitudinal axis of the weight.

In some embodiments, a vibration damper may further comprise a third resilient member having an inside surface suitable for engaging and retaining a portion of the weight. The third resilient member may be mounted to a portion of the handheld device having a surface suitable for engaging and retaining the third resilient member therein. The first, second and third resilient members may be equally spaced along the length of the weight.

In some embodiments, the handheld device may comprise a striking device. In some embodiments, the handheld device may be selected from a group consisting of baseball bats, cricket bats, golf clubs, hockey sticks, tennis rackets, squash rackets, racquetball rackets, badminton rackets, table tennis paddles, croquet mallets, polo sticks, lacrosse sticks, oars, pool cues, nightsticks, hammers, axes, picks, saws, files, rasps, punches, chisels and rachets.

In some embodiments, an excursion damper may comprise a weight, a first resilient member having an inside surface suitable for engaging and retaining a portion of the weight, and a second resilient member having an inside surface suitable for engaging and retaining a portion of the weight. The first resilient member may be mounted to a portion of a handheld device having a surface suitable for engaging and retaining the first resilient member therein. The second resilient member may be mounted to a portion of the handheld device having a surface suitable for engaging and retaining the second resilient member therein. The first and second resilient members may be arranged to bias the weight to a nominal position and to temporarily allow the weight to displace in three orthogonal directions with respect to the portion of the handheld device engaging the first resilient member.

The first and second resilient members may each include an annular channel. The annular channel of the first resilient member may be oriented in the opposite direction of the annular channel of the second resilient member.

In some embodiments, an excursion damper may further comprise a third resilient member having an inside surface suitable for engaging and retaining a portion of the weight. The third resilient member may be mounted to a portion of the handheld device having a surface suitable for engaging and retaining the third resilient member therein.

In some embodiments, an excursion damper may further comprise a fourth resilient member having an inside surface suitable for engaging and retaining a portion of the weight. The fourth resilient member may be mounted to a portion of the handheld device having a surface suitable for engaging and retaining the fourth resilient member therein.

The first resilient member may be mounted to a handle of the handheld device. In some embodiments, the handheld device may be selected from a group consisting of baseball bats, cricket bats, golf clubs, hockey sticks, tennis rackets, squash rackets, racquetball rackets, badminton rackets, table tennis paddles, croquet mallets, polo sticks, lacrosse sticks, oars, pool cues, nightsticks, hammers, axes, picks, saws, files, rasps, punches, chisels and rachets.

These and other embodiments which characterize the invention are pointed out with particularity in the claims annexed hereto and forming a part hereof. However, for a better understanding of the invention, its advantages and objectives obtained by its use, reference should be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

FIGS. 11A-11C show respective front, side and back views of another embodiment of a resilient member.

FIGS. 12A-12C show respective front, side and back views of another embodiment of a resilient member.

DETAILED DESCRIPTION OF THE INVENTION

Figure 1:
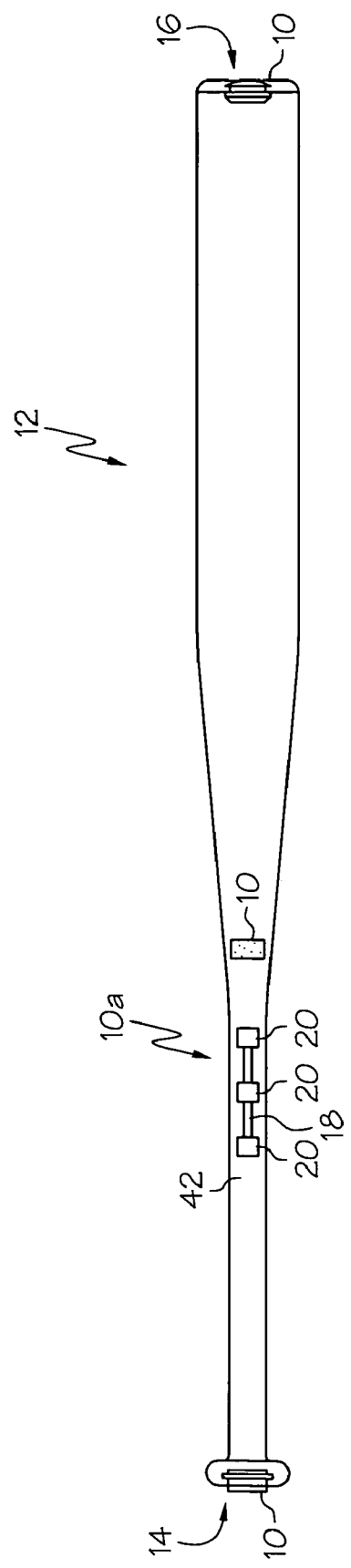
FIG. 1 shows a baseball bat having embodiments of vibration dampers.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the Figures shall refer to like features unless otherwise indicated.

The present invention comprises a vibration damper for use in a variety of handheld devices, tools and/or instruments. FIG. 1 depicts an embodiment of an elongate handheld device 12, in this case a baseball bat, having a damper 10 which may absorb vibrations present in the device 12. The damper 10 may be installed in a housing or mount 42, which may be a portion of the device 12. FIG. 1 shows a damper 10 mounted at the first end 14 of the bat, and another damper 10 mounted at the second end 16 of the bat. Another embodiment of a damper 10a is installed within a handle portion of the bat 12. Thus, any portion of the bat 12 may comprise a mount 42. In various embodiments, a damper 10 may be located along any portion of the bat 12.

Figure 2:
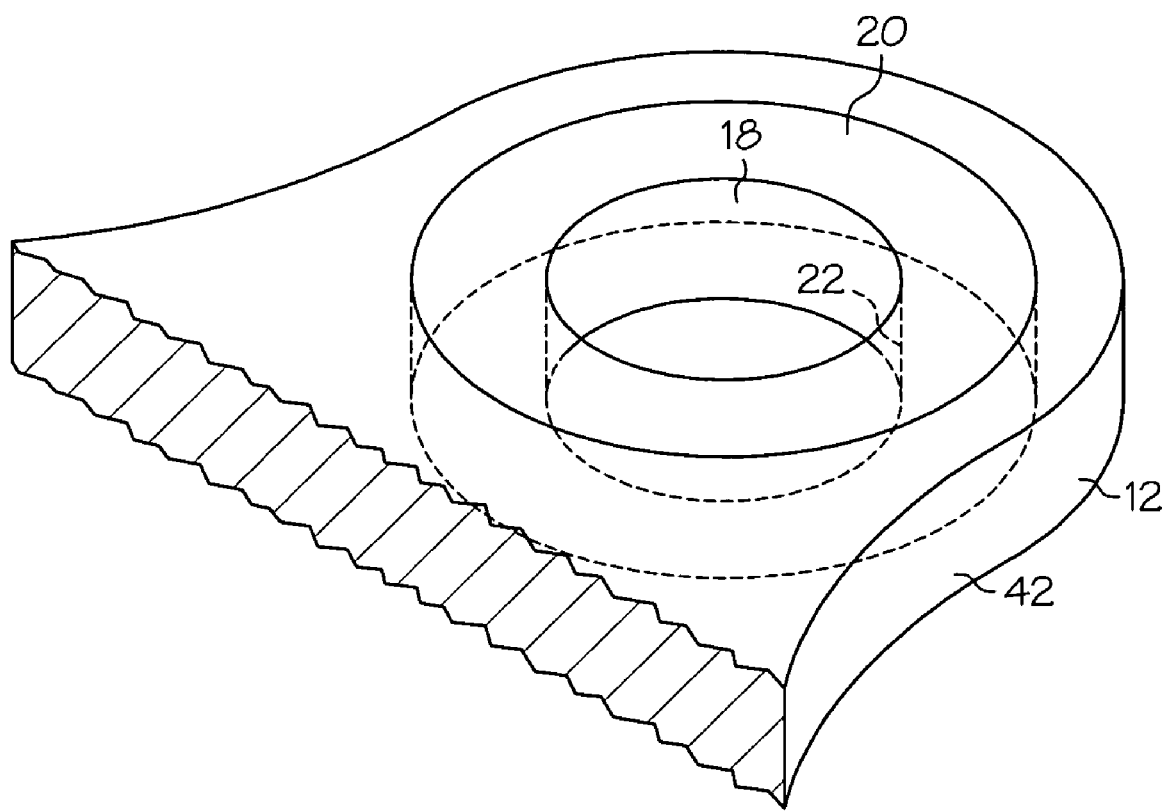
FIG. 2 shows an embodiment of a vibration damper in greater detail.

FIG. 2 shows an embodiment of a damper 10 in greater detail. A damper 10 may comprise a weight 18 and a resilient portion or member 20. Desirably, the weight 18 provides a mass that is used by the damper 10 in conjunction with the resilient member 20 to resist movement and/or damp vibrations. The weight 18 may be supported by the resilient member 20 and may deflect with respect to the mount 42. Desirably, the resilient member 20 may bias the weight 18 toward a nominal position. Upon a deflection between the weight 18 and the mount 42, portions of the resilient member 20 may elongate while other portions may compress and/or distend. Inherent resilience of the resilient member 20 may then work to eventually return the weight 18 to the original position.

A weight 18 may have any suitable shape. A resilient member 20 may have any shape that is suitable to support the weight 18. Various embodiments of weights 18 and resilient members 20 may be used to form dampers 10 having varying resonant frequencies and frequency response curves.

The mount 42 or the apparatus 12 desirably includes a surface suitable for engaging and retaining the resilient member 20 therein. The resilient member 20 desirably includes an inside surface suitable for engaging and retaining the weight 18 therein.

The weight 18 may be at least partially supported by the resilient portion 20. In some embodiments, the weight 18 may be entirely supported by the resilient portion 20, and may even be located within the resilient portion 20. The resilient portion 20 may be at least partially supported by the mount 42, and may be entirely supported by the mount 42.

The weight 18 may be formed from any suitable material and is desirably a fairly dense metal such as tungsten, lead, steel, brass, aluminum, and various alloys and combinations thereof. The weight 18 may additionally be formed from non-metals such as plastics, rubbers and the like. In some embodiments, the weight 18 may comprise the same material as the resilient portion 20.

The resilient portion 20 desirably has a greater elasticity than the weight 18. The resilient portion 20 may comprise an elastic or elastomeric material, and may be constructed in whole or in part from a variety of materials including Anylin®, Santoprene®, rubber, plastic, and the like.

In some embodiments, the damper 10 may have a generally cylindrical shape. The weight 18 may be solid, and may also have a cylindrical shape. The resilient portion 20 may be solid, and may have an annular shape. A resilient portion 20 having an annular shape may have a central axis, and may be oriented such that the central axis of the resilient portion is centered upon a central axis of the weight 18.

A damper 10 may be particularly suited to damping shock or vibrations in a damping plane. For example, a resilient portion 20 having an annular shape may have a central axis, and the damping plane of the damper 10 may be orthogonal to the central axis. A damping plane may have a first axis and a second axis.

Figure 3:
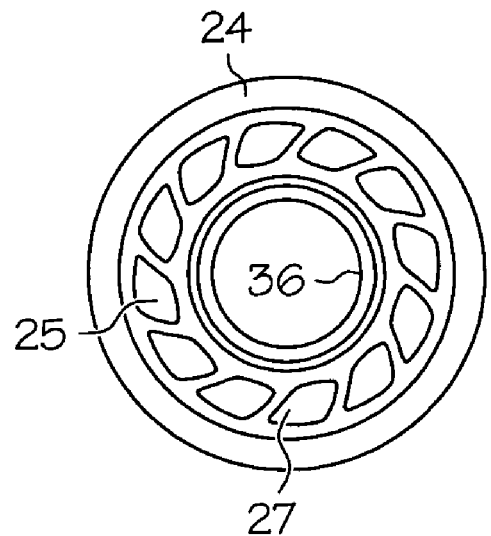
FIG. 3 shows another embodiment of a damper.
Figure 4:
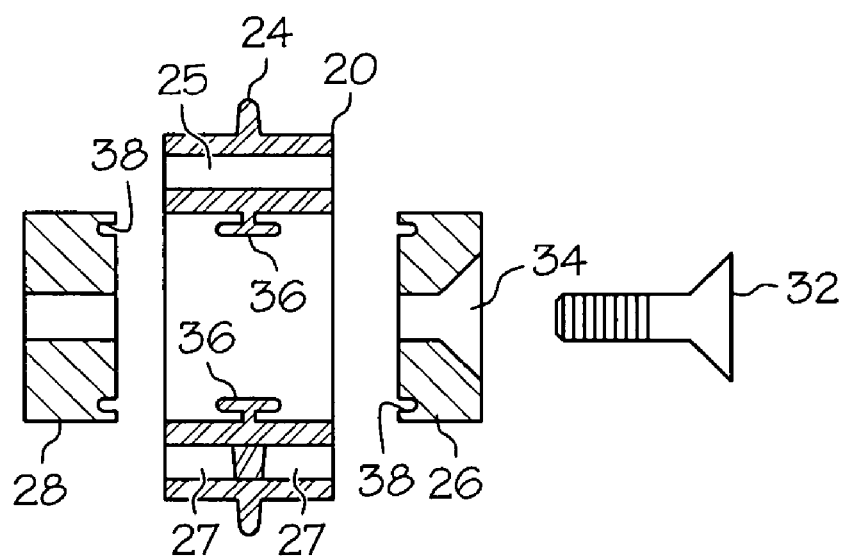
FIG. 4 shows an exploded view of another embodiment of a damper.

FIGS. 3 and 4 show an alternative embodiment of a damper 10. The resilient portion 20 may include one or more apertures 25. The location, size and shape of the apertures 25 in the resilient portion impact the performance characteristics of the damper 10. Apertures 25 may extend through the entire depth of the resilient portion 20. Each aperture 25 may have a longitudinal axis which may be parallel to the central axis of the resilient portion 20. Alternatively, a resilient portion 20 may include cavities 27 which do not extend through the entire depth of the resilient portion 20.

The weight 18 may comprise a plurality of portions which may be secured to one another. FIG. 3 shows a first weight portion 26, a second weight portion 28 and a fastener 32. The resilient portion 20 may further include a mating portion 36 which may help to secure the weight 18 to the resilient portion 20. The first weight portion 26 and the second weight portion 28 may include retaining grooves 38 which may be shaped to receive a mating portion 36. The fastener 32 may extend through the first weight portion 26 and may be attached to the second weight portion 28, thereby securing the weight 18 to the resilient portion 20.

The resilient portion 20 may further include a collar 24 which may provide additional securement to the mount 42. A collar 24 may be formed integrally with the resilient portion 20 or may comprise a separate piece. A collar 24 may be formed from a different material than the resilient portion 20.

Figure 5:
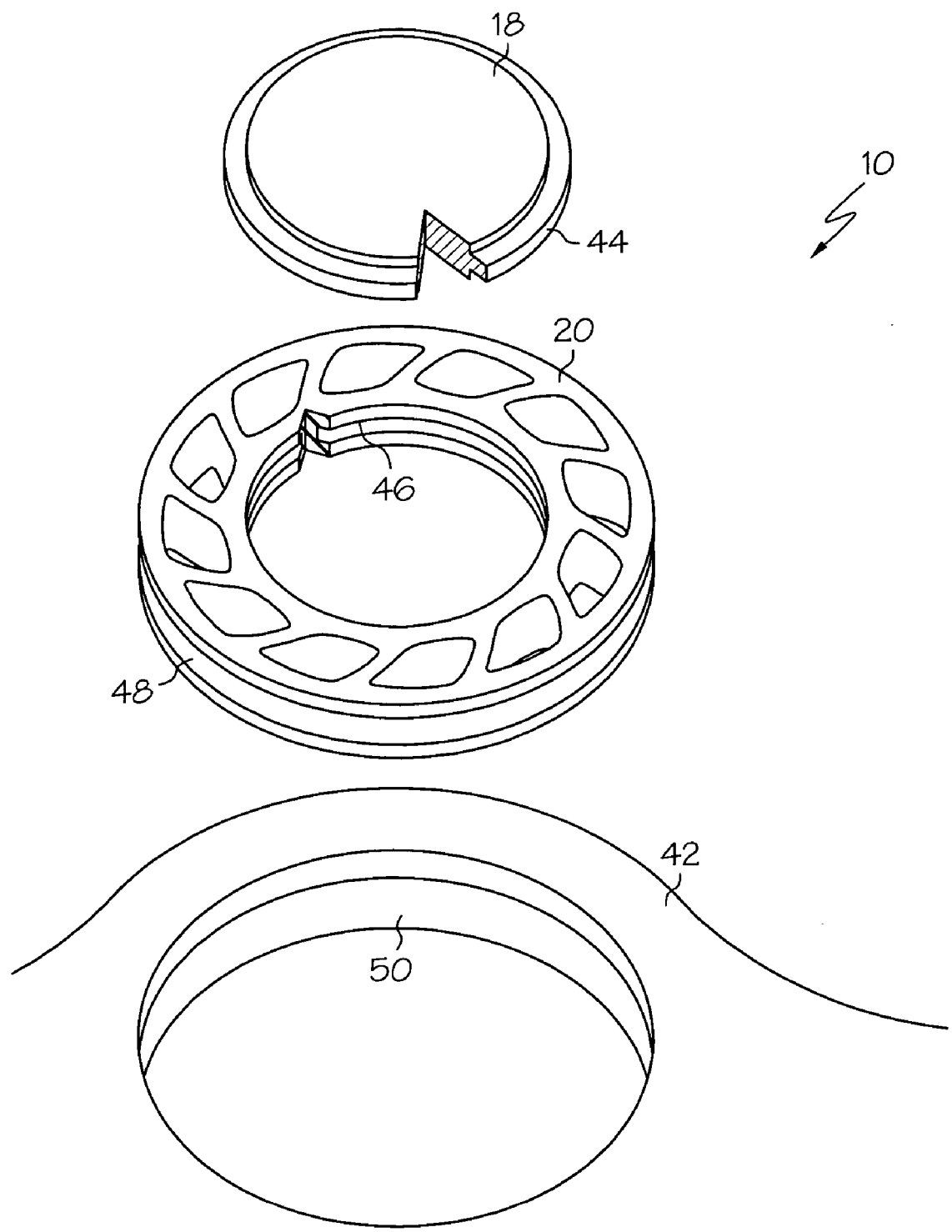
FIG. 5 shows an exploded view of another embodiment of a damper.

FIG. 5 shows another embodiment of a damper 10 according to the present invention. The weight 18 may include a mating portion 44, such as a ridge or flange, and the resilient portion 20 may include a mating portion 46, such as a groove, arranged to receive the mating portion 44 of the weight. The resilient portion 20 may further include another mating portion 48, for example a groove, for securement to the mount 42. Accordingly, the mount 42 may include a mating portion 50, such as a ridge, arranged to receive the mating portion 48 of the resilient member 20.

Figure 6:
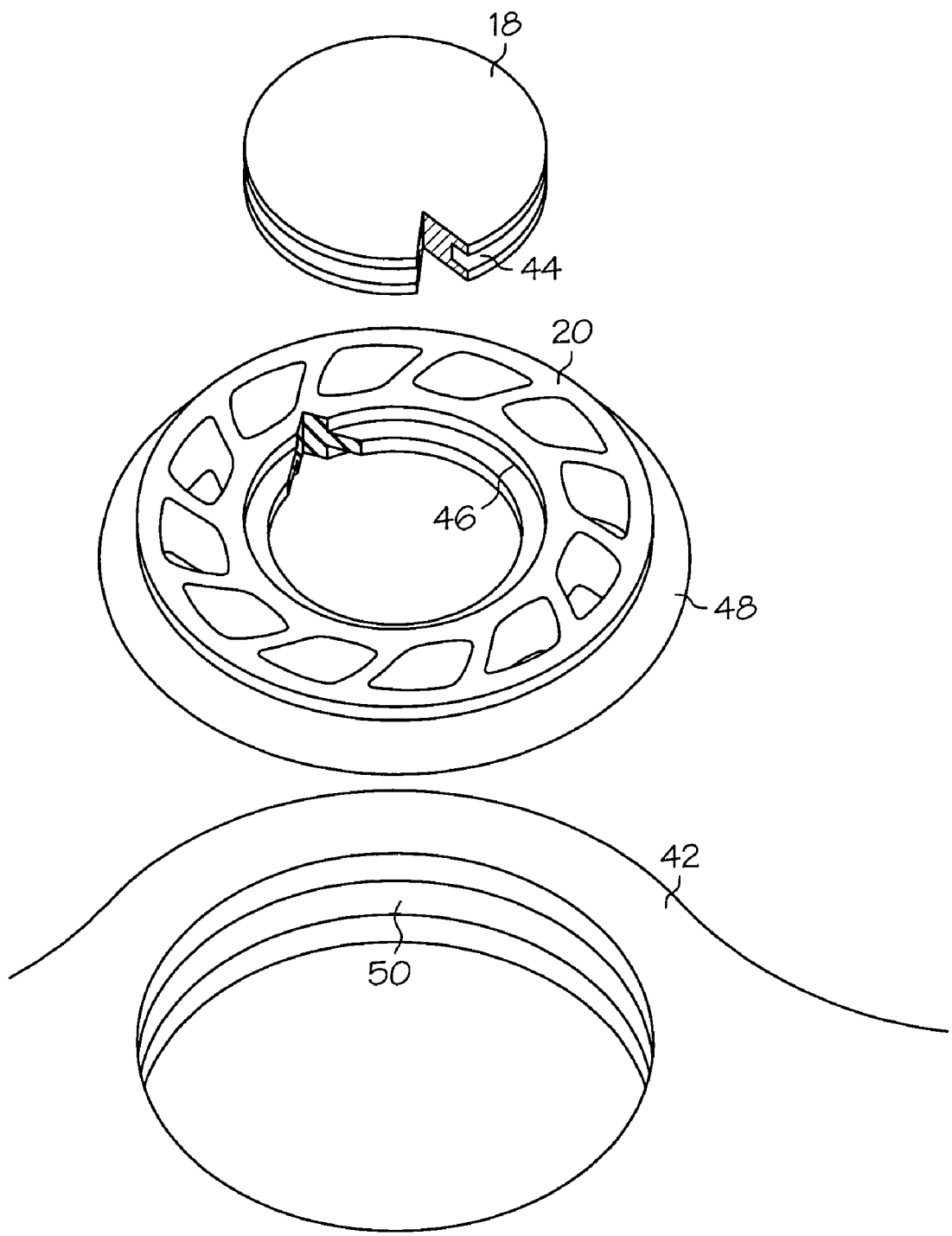
FIG. 6 shows an exploded view of another embodiment of a damper.

FIG. 6 shows another embodiment of a damper 10 according to the present invention. The weight 18 may include a mating portion 44, such as a groove, and the resilient portion 20 may include a mating portion 46, such as a ridge or flange, arranged to receive the mating portion 44 of the weight. The resilient portion 20 may further include another mating portion 48, for example a ridge, for securement to the mount 42, which may include a mating portion 50, such as a groove, arranged to receive the mating portion 48 of the resilient member 20.

It should be noted that the various mating portion embodiments depicted in the Figures are merely examples of configurations which may be used to join the mount 42, resilient portion 20 and weight 18. The configurations shown and described herein are preferred, as they allow a user to remove and replace the various components as desired. Alternative arrangements may include the application of permanent or temporary adhesives as well as other interfacing arrangements. The present invention is directed at these configurations and all other which may be known to one of ordinary skill in the art.

Figure 7:
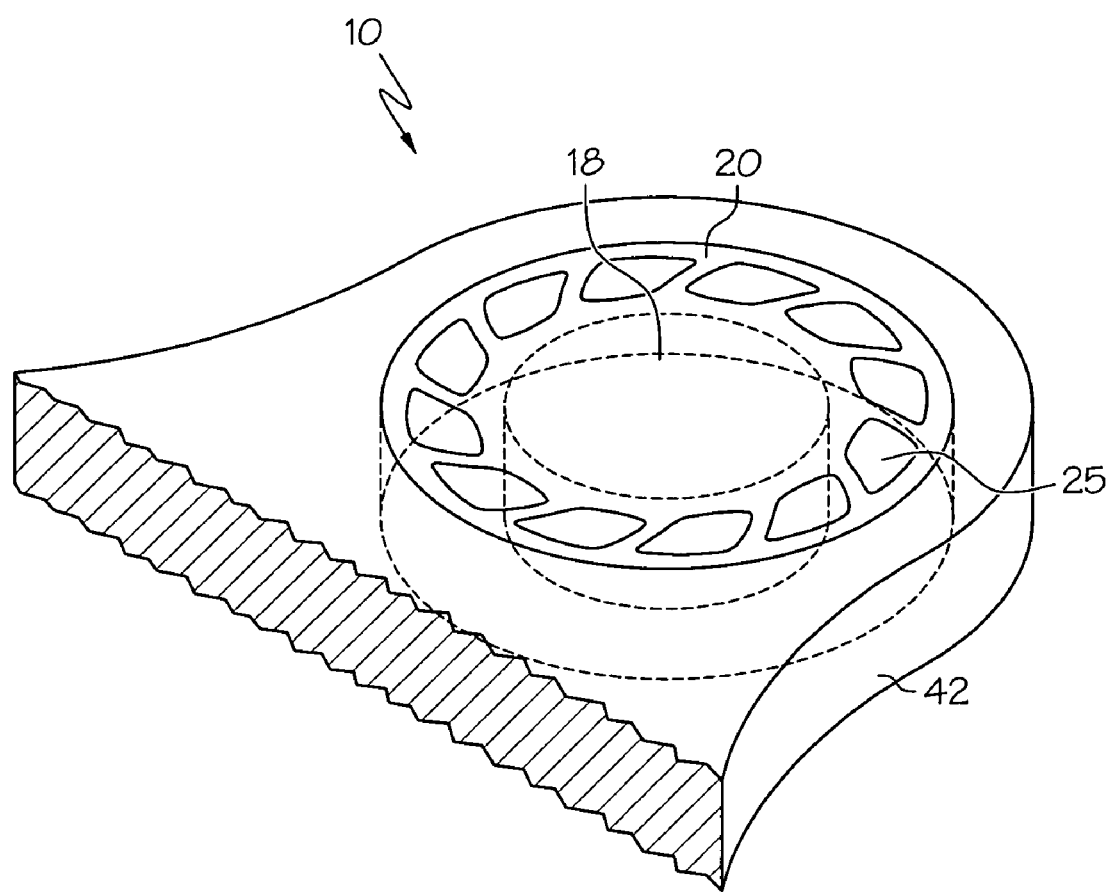
FIG. 7 shows another embodiment of a damper.

FIG. 7 shows another embodiment of a damper 10 according to the present invention. The weight 18 and resilient portion 20 may comprise a single piece of material. Thus, the weight 18 may be integrally formed with the resilient portion 20. The resilient portion 20 may be entirely supported by a mount 42. The resilient portion may include one or more apertures 25 (or cavities 27 as described with respect to FIGS. 2 and 3).

Figure 8:
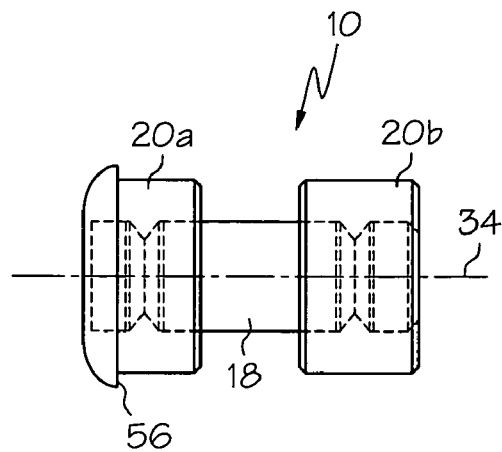
FIG. 8 shows another embodiment of a damper.
Figure 9:
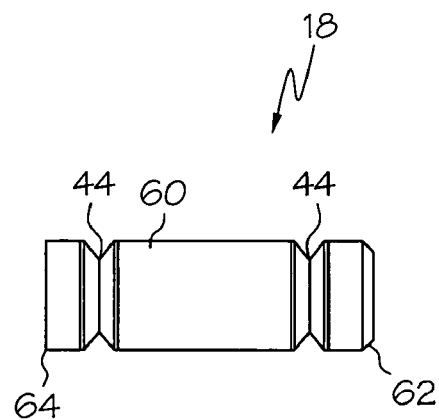
FIG. 9 shows an embodiment of a weight.

FIG. 8 shows another embodiment of a damper 10, which may comprise a weight 18, a first resilient portion 20a and a second resilient portion 20b. The damper 10 may have a longitudinal axis 34. FIGS. 9-11C show the components of the damper 10 in more detail. Referring to FIG. 9, a weight 18 may be cylindrical in shape having a central longitudinal axis. The weight 18 may include an outer surface 60 and may include one or more mating portions 44 extending beneath the outer surface 60. Each mating portion 44 may comprise a recess or groove, and may extend circumferentially about at least a portion of the weight 18. An edge of the weight 18 may comprise a rounded edge 62 or a squared edge 64.

Figures 10A, 10B:
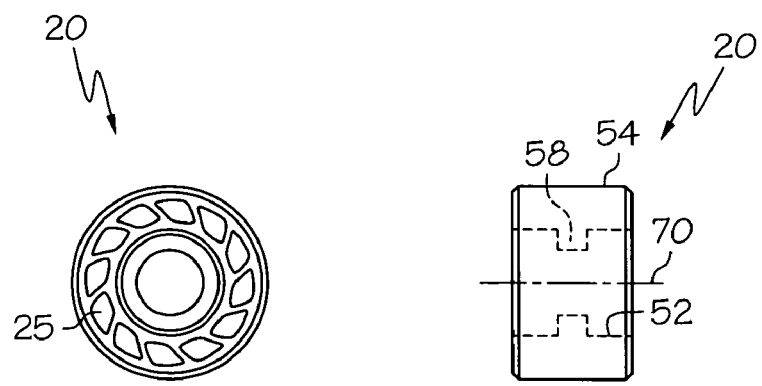
FIGS. 10A and 10B show respective front and side views of an embodiment of a resilient member.

FIGS. 10A and 10B show front and side views of an embodiment of a resilient member 20, which may comprise a second resilient member 20b in some embodiments of a damper 10. The resilient member 20 may comprise an annular shape having an inner surface 52, an outer surface 54 and a central axis 70. The resilient member 20 may further include a plurality of apertures 25. Each aperture 25 may have a longitudinal axis which may be parallel to the central axis 70. The inner edge 52 may include an internal flange or mating portion 58 which may extend toward the central longitudinal axis. When the resilient member 20 is positioned to support the weight 18, a portion of the outer surface 60 of the weight 18 may abut the inner surface 52 of the resilient member 20. The outer surface 60 of the weight 18 may be frictionally engaged with the inner surface 52 of the resilient member 20. Further, the mating portion 58 of the resilient member 20 may be engaged with the mating portion 44 of the weight 18. For example, the internal mounting flange 58 of the resilient portion 20 may extend into the groove 44 of the weight 18.

FIGS. 11A-11C show front, back and side views of another embodiment of a resilient portion 20, which may comprise a first resilient member 20a in some embodiments of a damper 10. The resilient member 20 may include the features of other resilient portions described herein, and may also include a mounting flange 56 which may extend a greater radial distance from the central longitudinal axis than the outer edge 54. The mounting flange 56 may abut a portion of a mount to which the resilient portion is engaged. For example, when the damper 10 is installed within a tubular member or mount, the resilient member 20 may be positioned such that the outer surface 54 of the resilient member 20 abuts an inner surface of the tubular mount. The mounting flange 56 may be positioned to abut an end edge of the tubular mount. The mounting flange 56 may prevent the resilient portion 20, and thus the damper 10, from translocating farther into the tubular mount.

FIGS. 12A-12C show front, back and side views of another embodiment of a resilient portion 20. The resilient member 20 may include the features of other resilient portions described herein, and may also include a frictional engagement flange 72 which may extend from the outer edge 54. In some embodiments, the frictional engagement flange 72 may extend a greater radial distance from the central longitudinal axis than the mounting flange 56. When the resilient member 20 is engaged with a mount, the frictional engagement flange 72 may deform and frictionally engage the mount.

In some embodiments, the space between the frictional engagement flange 72 and the mounting flange 56 may comprise a mating portion or channel 74. The channel 74 may receive an appropriate mating portion of a mount.

In other embodiments, a damper 10 may comprise a weight 18 and any number of resilient members 20. Any suitable embodiment(s) of resilient members 20 may be used in a damper 10. The weight 18 may include a mating portion 44 for each resilient member 20. The resilient members 20 may be spaced along the length of the weight 18. For example, three, four or five or more resilient members 20 may be used with a single weight 18.

Figure 13:
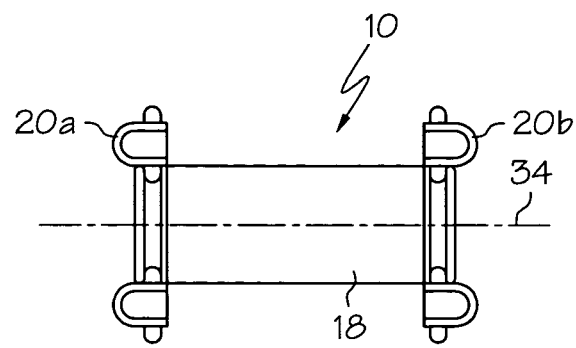
FIG. 13 shows another embodiment of a damper.

FIG. 13 shows another embodiment of a damper 10, which may comprise a weight 18, a first resilient portion 20a and a second resilient portion 20b. The first resilient portion 20a and the second resilient portion 20b may be similarly shaped and may be oriented in opposite directions. The damper 10 may have a longitudinal axis 34. The weight 18 may displace with respect to the resilient members 20 in directions orthogonal to the longitudinal axis 34. The damper 10 may further comprise an excursion damper 10, wherein the weight may displace with respect to the resilient members 20 in directions parallel to the longitudinal axis 34.

Figure 14:
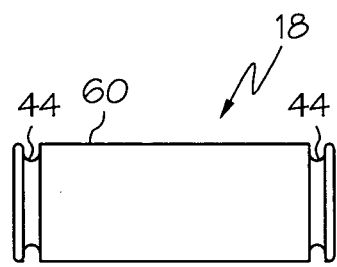
FIG. 14 shows another embodiment of a weight.

FIG. 14 shows an embodiment of a weight 18 in more detail. The weight 18 may be cylindrical in shape and may have a central longitudinal axis. The weight 18 may include an outer surface 60 and may include one or more mating portions 44 extending beneath the outer surface 60. Each mating portion 44 may comprise a recess or groove, and may extend circumferentially about at least a portion of the weight 18.

Figure 15A:
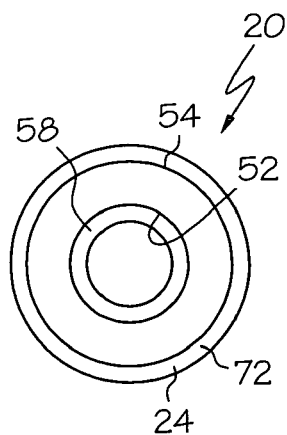
FIGS. 15A-15C show respective front, side sectional and rear views of an embodiment of a resilient member.
Figure 15B:
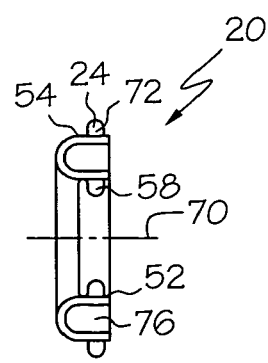
Figure 15C:
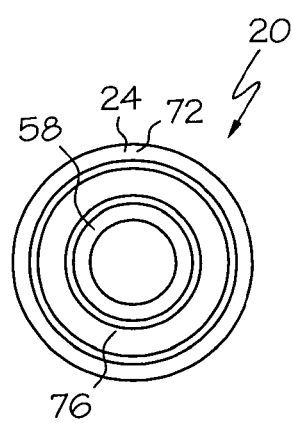

FIGS. 15A-15C show front, sectional and back views of an embodiment of a resilient portion or member 20. The resilient member 20 may comprise an annular shape having an inner surface 52, an outer surface 54 and a central axis 70. The resilient member 20 may include an annular channel 76, which may extend about the longitudinal axis 70 and may have a U-shaped cross-section. The vertical axis of the U-shape may be oriented in a direction parallel to the longitudinal axis 34 of the damper 10. The annular channel 76 may provide added compliance in directions parallel to the central axis 70. Thus, a weight 18 that is engaged with the resilient member 20 may move in directions parallel to the central axis 70.

Figure 16:
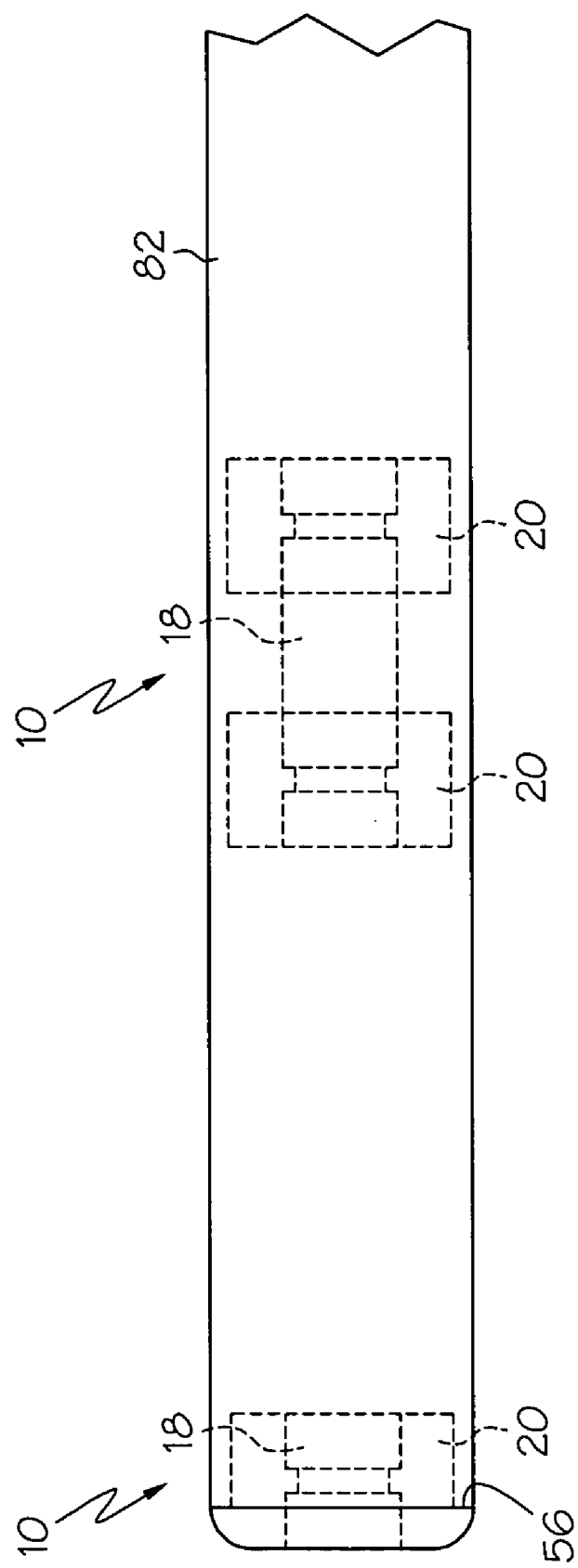
FIG. 16 shows a handle of a handheld device.

FIG. 16 shows a handle 82, which may represent the handle of a handheld device 12 such as a bat, club, stick, racket, paddle, mallet, oar, pool cue, tool or the like. The handle 82 may include any number of dampers 10. Each damper 10 may comprise any embodiment of a damper 10. A damper 10 that is located at the end of a handle 82 may comprise a weight 18 and a resilient member 20 having a mounting flange 56. The resilient member 20 may be positioned with the mounting flange 56 abutting an end of the handle 82. Dampers 10 comprising multiple resilient members 20 may be mounted to or within the handle 82. Dampers 10 maybe positioned such that the longitudinal axis of the weight 18 corresponds with the longitudinal axis of each resilient member 20, all of which may correspond with a longitudinal axis of the handle 82 when the damper 10 is resting at in a nominal configuration.

Dampers 10 according to the present invention may have any suitable size or shape, and may be made from any suitable materials. Further, different weights 18 may be used within a given damper 10. For example, a plurality of interchangeable weights 18, each made from a material of varying density, may be used within a given resilient portion 20. The weight 18 to be used may be selected to alter performance characteristics which an individual user may find more or less desirable.

Resilient portions 20 may be similarly interchangeable. For example, a plurality of resilient portions 20 may be sized to fit in a given mount 42 and used with a given weight 18. The different resilient portions 20 may be made from different materials and/or have differing configurations of apertures 25, cavities 27 and columns 30. An appropriate resilient portion 20 may be selected to achieve preferred damping and attenuation characteristics.

The overall shape of a damper 10, and the individual elements of the damper 10, may be modified according to the specific application.

Dampers 10 may be mounted to a handheld device 12 at any suitable location, including anywhere upon or within a handle 82 or other portion of the device 12. Some devices 12 will vibrate at a natural frequency producing a number of nodes. Desirably, a damper 10 may be mounted at midpoints between nodes. When the device 12 is used for striking, the device will include a striking surface. Dampers 10 maybe mounted between a striking surface and a handle 82. In a bat, dampers 10 may be mounted to or within the handle, the barrel and the transitioning taper. In clubs, dampers 10 may be mounted to or within the head and anywhere along the shaft, desirably between vibration nodes. In a racket, dampers 10 may be mounted to or within the head, throat and handle. In a striking tool, dampers may be mounted to or within any portion of the handle and/or the head. In a pool cue, dampers 10 may be mounted to or within any portion of the cue. Desirably, dampers 10 in a pool cue may be excursion dampers wherein the weight may displace in three orthogonal directions with respect to the resilient member(s). Desirably, dampers 10 in a pool cue may damp vibrations in the axial direction of the cue.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A vibration damper for a handheld device comprising:
   a weight;
   a first resilient member having an inside surface suitable for engaging and retaining a portion of the weight, the first resilient member comprising a first end, a second end and an annular channel having a U-shaped cross-section, a top of the U-shape located at the first end and a bottom of the U-shape located at the second end; and
   a second resilient member having an inside surface suitable for engaging and retaining a portion of the weight, the second resilient member comprising an annular channel having a U-shaped cross-section;
   wherein the first resilient member is mounted to a portion of a handheld device having a surface suitable for engaging and retaining the first resilient member therein, the second resilient member is mounted to a portion of the handheld device having a surface suitable for engaging and retaining the second resilient member therein, and the annular channel of the first resilient member comprises a mirror image of the annular channel of the second resilient member.

2. The vibration damper of claim 1, wherein the handheld device includes a handle, and the damper is mounted to the handle.

3. The vibration damper of claim 2, wherein the damper is mounted within the handle.

4. The vibration damper of claim 3, wherein the damper is hidden from view.

5. The vibration damper of claim 1, wherein the resilient member comprises a cylindrical shape having a central axis, and the central axis of the resilient member is centered upon a longitudinal axis of a tubular portion of the handheld device.

6. The vibration damper of claim 1, wherein an outer surface of at least one resilient member includes a raised engagement flange for frictionally engaging the handheld device.

7. The vibration damper of claim 1, wherein at least a portion of the weight is made of tungsten.

8. The vibration damper of claim 1, wherein the weight is entirely supported by the first resilient member and the second resilient member.

9. The vibration damper of claim 1, wherein the inside surface of the first resilient member includes a first internal flange, the inside surface of the second resilient member includes a second internal flange, and the weight includes a first recess arranged to mate with said first internal flange and a second recess arranged to mate with said second internal flange.

10. The vibration damper of claim 1, wherein the first resilient member comprises an annular shape having a central axis, the second resilient member comprises an annular shape having a central axis, and the weight comprises a cylindrical shape having a longitudinal axis; wherein the central axes of the first and second resilient members are centered upon the longitudinal axis of the weight.

11. The vibration damper of claim 1, wherein the first resilient member includes a mounting flange arranged to abut the portion of the handheld device engaging and retaining the first resilient member.

12. The vibration damper of claim 11, wherein the damper is mounted within a portion of a handle, the mounting flange of the first resilient member abutting an end of the handle.

13. The vibration damper of claim 1, wherein the first and second resilient members bias the weight toward a nominal position, wherein the weight has a longitudinal axis, and wherein the weight may displace with respect to the first damper in directions orthogonal to the longitudinal axis of the weight.

14. The vibration damper of claim 13, wherein the weight may also displace with respect to the first damper in directions parallel to the longitudinal axis of the weight.

15. The vibration damper of claim 1, further comprising a third resilient member having an inside surface suitable for engaging and retaining a portion of the weight, the third resilient member mounted to a portion of a handheld device having a surface suitable for engaging and retaining the third resilient member therein.

16. The vibration damper of claim 15, wherein the first, second and third resilient members are equally spaced along the length of the weight.

17. The vibration damper of claim 1, wherein the handheld device comprises a striking device.

18. The vibration damper of claim 1, wherein the handheld device is selected from a group consisting of baseball bats, cricket bats, golf clubs, hockey sticks, tennis rackets, squash rackets, racquetball rackets, badminton rackets, table tennis paddles, croquet mallets, polo sticks, lacrosse sticks, oars, pool cues, nightsticks, hammers, axes, picks, saws, files, rasps, punches, chisels and ratchets.

19. An excursion damper comprising:
   a weight having a first end and a second end;
   a first resilient member having an inside surface suitable for engaging and retaining a portion of the weight; and
   a second resilient member having an inside surface suitable for engaging and retaining a portion of the weight;
   each resilient member further comprising a first end, a second end and an annular channel having a U-shaped cross-section, a top of the U-shape located at the first end of the resilient member and a bottom of the U-shape located at the second end of the resilient member, the annular channel of the first resilient member being oriented in the opposite direction of the annular channel of the second resilient member;
   wherein the first resilient member is mounted to a portion of a handheld device having a surface suitable for engaging and retaining the first resilient member therein; the second resilient member is mounted to a portion of the handheld device having a surface suitable for engaging and retaining the second resilient member therein; the first and second resilient members arranged to bias the weight to a nominal position and to temporarily allow the weight to displace in three orthogonal directions with respect to the portion of the handheld device engaging the first resilient member.

20. The excursion damper of claim 19, wherein the second end of the first resilient member extends past the first end of the weight.

21. The excursion damper of claim 19, further comprising a third resilient member having an inside surface suitable for engaging and retaining a portion of the weight, the third resilient member mounted to a portion of the handheld device having a surface suitable for engaging and retaining the third resilient member therein.

22. The excursion damper of claim 21, further comprising a fourth resilient member having an inside surface suitable for engaging and retaining a portion of the weight, the fourth resilient member mounted to a portion of the handheld device having a surface suitable for engaging and retaining the fourth resilient member therein.

23. The excursion damper of claim 20, wherein the second end of the second resilient member extends past the second end of the weight.

24. The excursion damper of claim 19, wherein the handheld device is selected from a group consisting of baseball bats, cricket bats, golf clubs, hockey sticks, tennis rackets, squash rackets, racquetball rackets, badminton rackets, table tennis paddles, croquet mallets, polo sticks, lacrosse sticks, oars, pool cues, nightsticks, hammers, axes, picks, saws, files, rasps, punches, chisels and ratchets.

* * * * *